United States Patent [19]
Nakata et al.

[11] Patent Number: 5,583,717
[45] Date of Patent: Dec. 10, 1996

[54] INFORMATION RECORDING/REPRODUCING DEVICE WITH A CLAMPING MECHANISM HAVING A COLLET ASSEMBLY PROVIDING A REDUCED PROFILE HEIGHT

[75] Inventors: Toshio Nakata; Naoyuki Okumura, both of Suwa, Japan

[73] Assignee: Seiko Epson Corporation, Tokyo-to, Japan

[21] Appl. No.: 206,987

[22] Filed: Mar. 4, 1994

[30] Foreign Application Priority Data

| Mar. 4, 1993 | [JP] | Japan | 5-044103 |
| Apr. 14, 1993 | [JP] | Japan | 5-087537 |
| Mar. 2, 1994 | [JP] | Japan | 6-032433 |

[51] Int. Cl.$^6$ ................................................. G11B 17/028
[52] U.S. Cl. ..................... 360/99.06; 360/99.12; 369/270
[58] Field of Search ............... 360/99.05, 99.06, 360/99.12, 98.08; 369/269, 270, 271

[56] References Cited

U.S. PATENT DOCUMENTS

| 4,216,510 | 8/1980 | Manzke et al. | 360/99.12 |
| 4,628,385 | 12/1986 | Janssen et al. | 369/270 |
| 4,694,361 | 9/1987 | Tsuchiya et al. | 360/97 |
| 4,709,283 | 11/1987 | Kitahara et al. | 360/99 |
| 4,760,477 | 7/1988 | Takikawa | 360/97 |
| 4,807,068 | 2/1989 | Shiraishi | 360/99.06 |
| 5,060,096 | 10/1991 | Hirose et al. | 360/99.12 |

FOREIGN PATENT DOCUMENTS

| 26837 | 4/1981 | European Pat. Off. | 360/99.05 |
| 174052 | 10/1986 | Japan. | |
| 37944 | 1/1989 | Japan. | |
| 177052 | 7/1990 | Japan. | |
| 37160 | 10/1990 | Japan. | |
| 21263 | 4/1992 | Japan. | |

*Primary Examiner*—Stuart S. Levy
*Assistant Examiner*—George J. Letscher
*Attorney, Agent, or Firm*—Harold T. Tsiang

[57] ABSTRACT

An information recording/reproducing device is provided with design features permitting are reduction in device height making it readily suitable for compact utility in a computer assembly, such as, a laptop computer or the like as well as a simplification of parts to provide for a reduction in manufacturing and assembly costs. These features include a structure for miniaturization and simplification of the collet mechanism and its assembly for clamping the recording medium, and the employment of a light guide member in the recording medium detection system for detecting the instantaneous rotational position of the recording medium from which a timing signal is derived. With the improvement of the clamping mechanism and use of a light guide member, significant miniaturization and thinning or reduction in casing height of the device can be achieved. Also, a simple but highly effective locking mechanism, not requiring a separate assemblage of parts, is utilized for preventing the extended carriage arm of the recording/reproducing head from accidentally transferring from its standby position to its operational position in the absence of a recording medium inserted into the information recording/reproducing device subjecting it to damage.

11 Claims, 13 Drawing Sheets

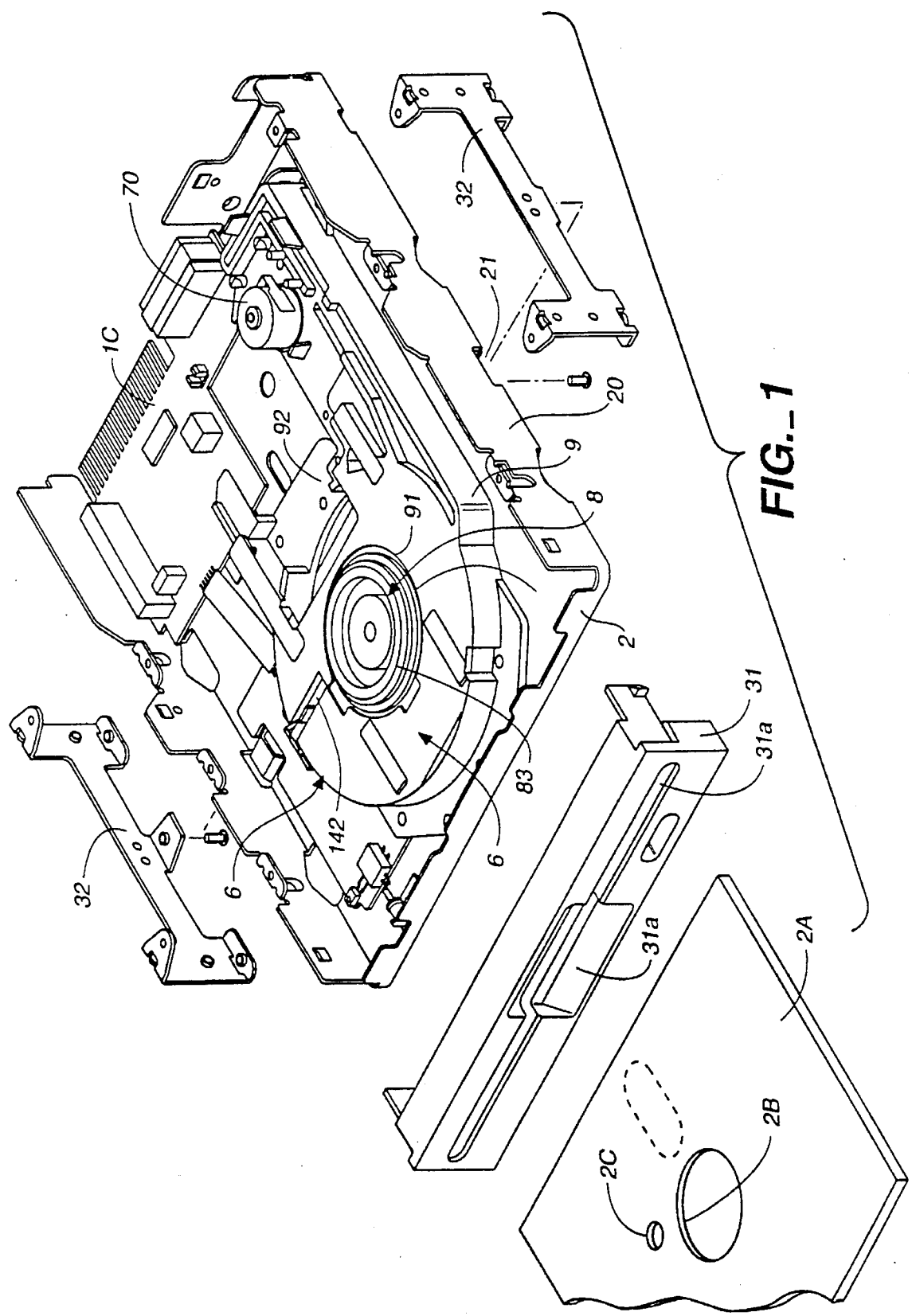
FIG._1

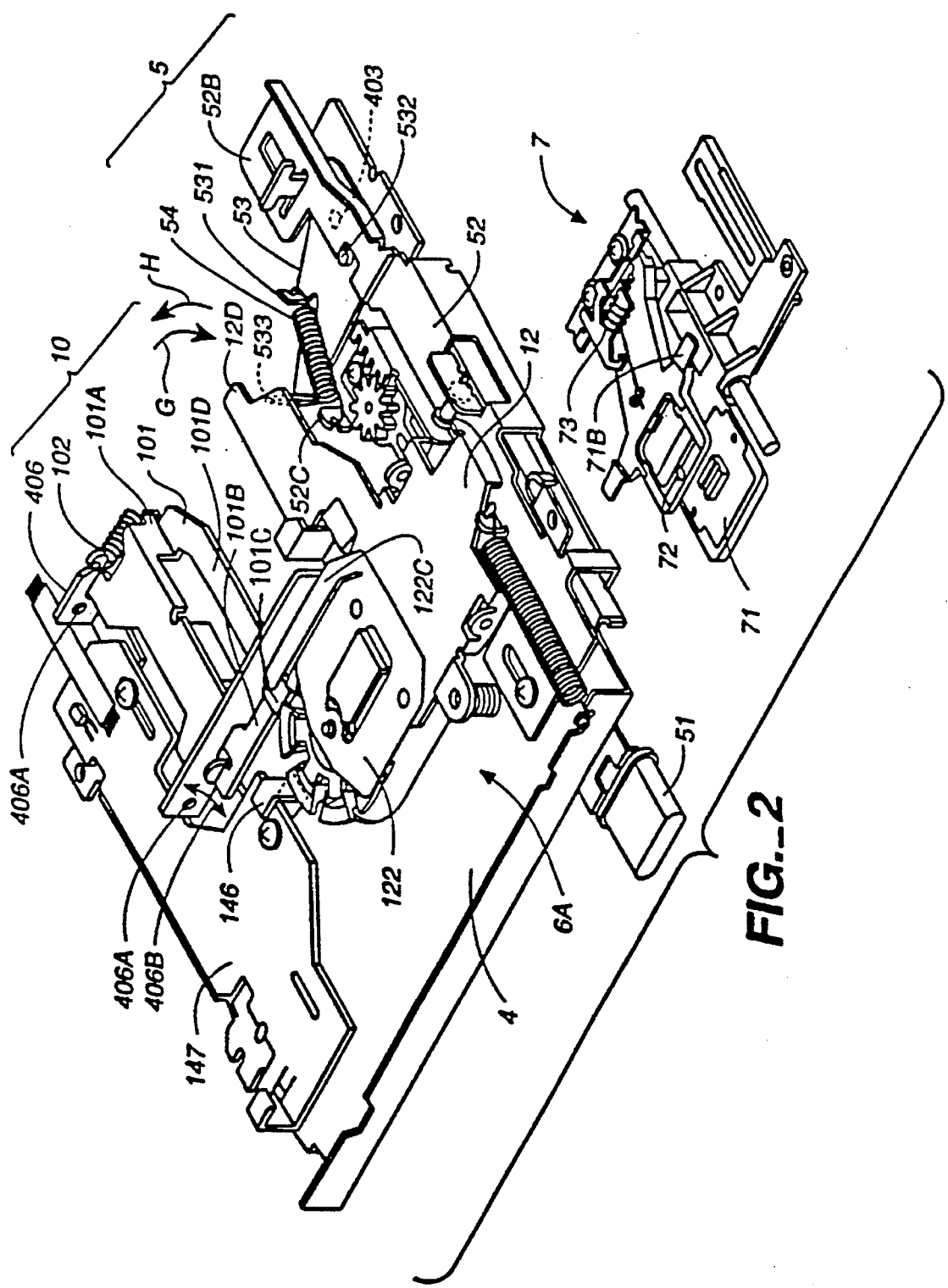
FIG._2

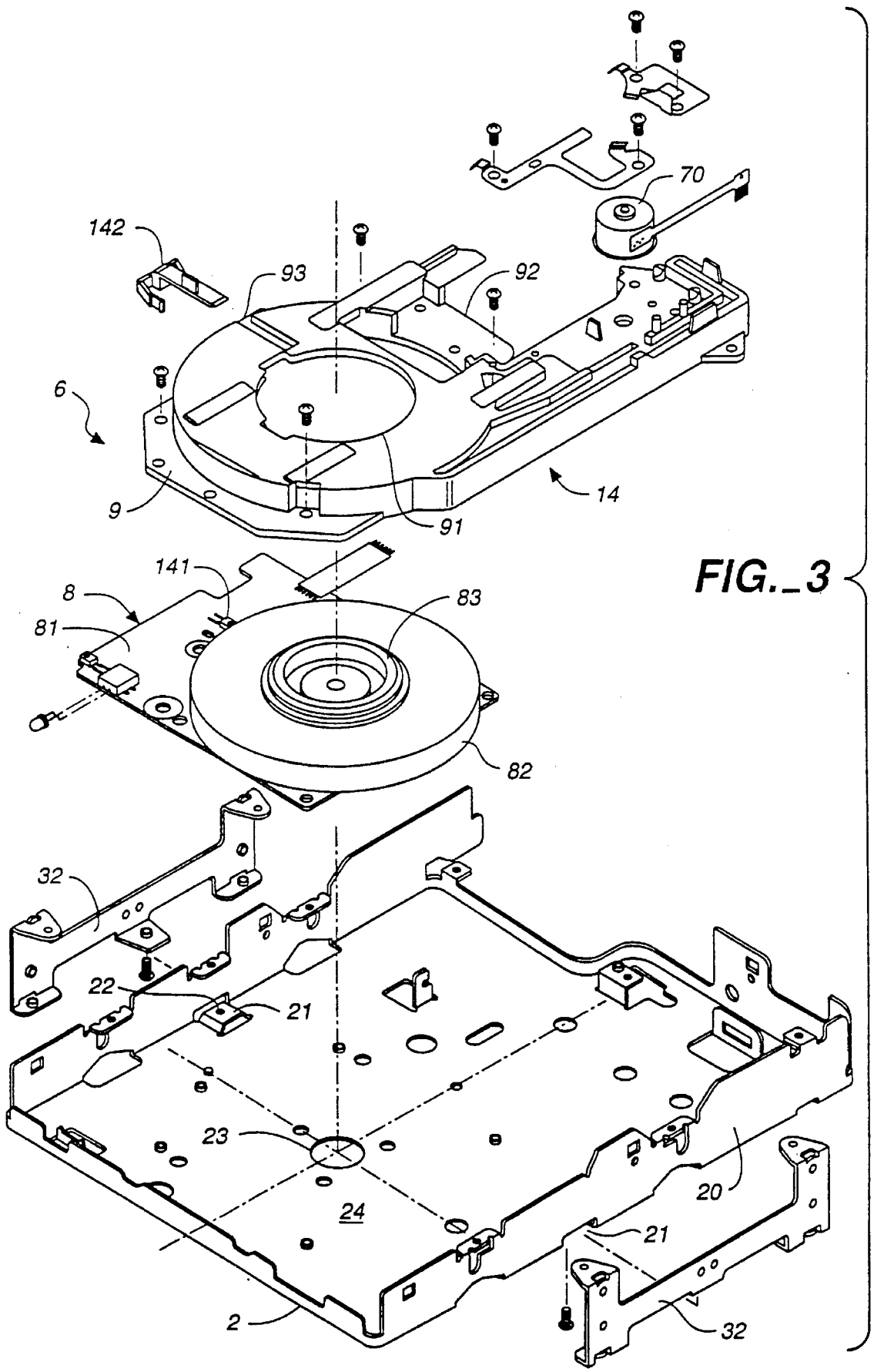
FIG._3

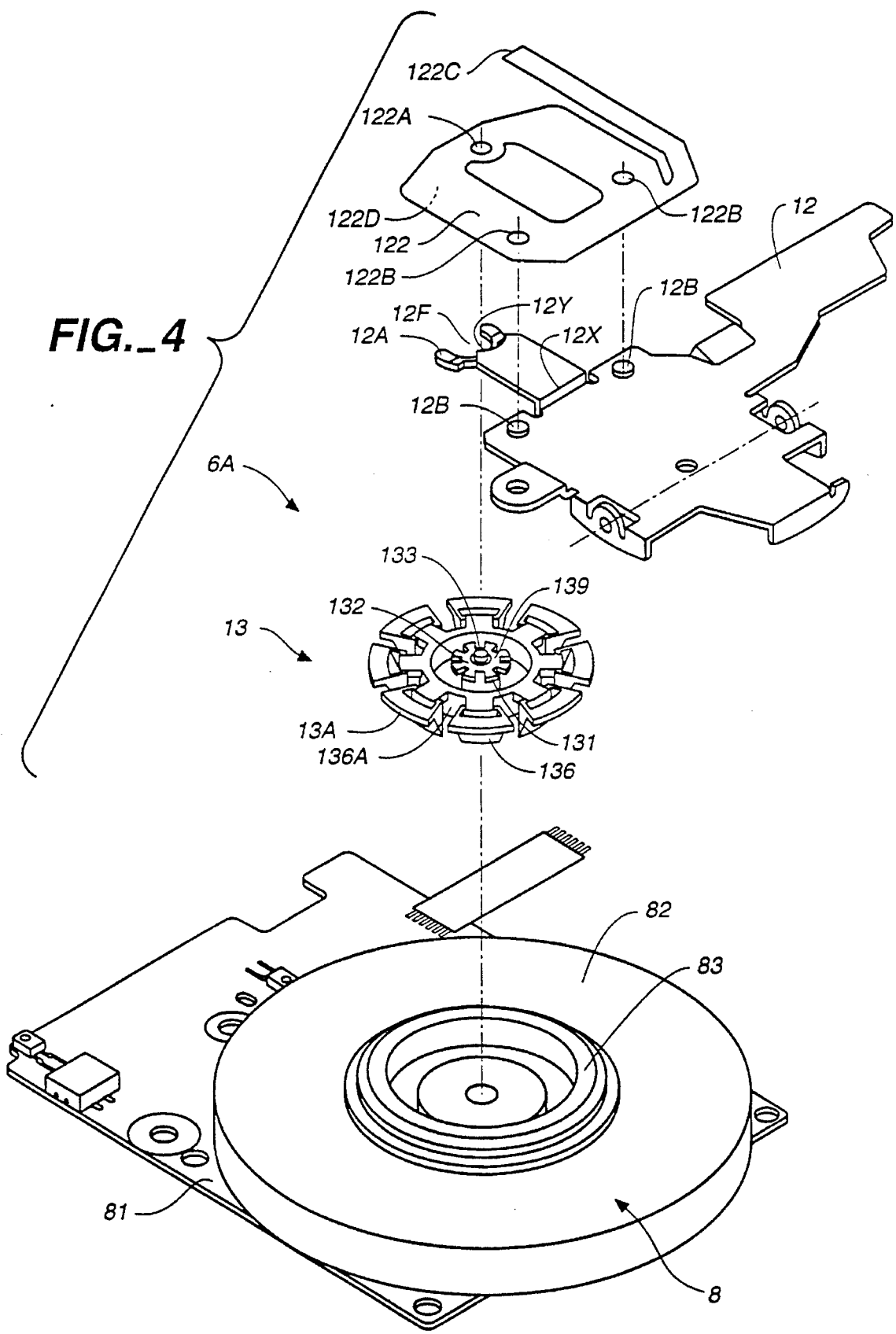
FIG._4

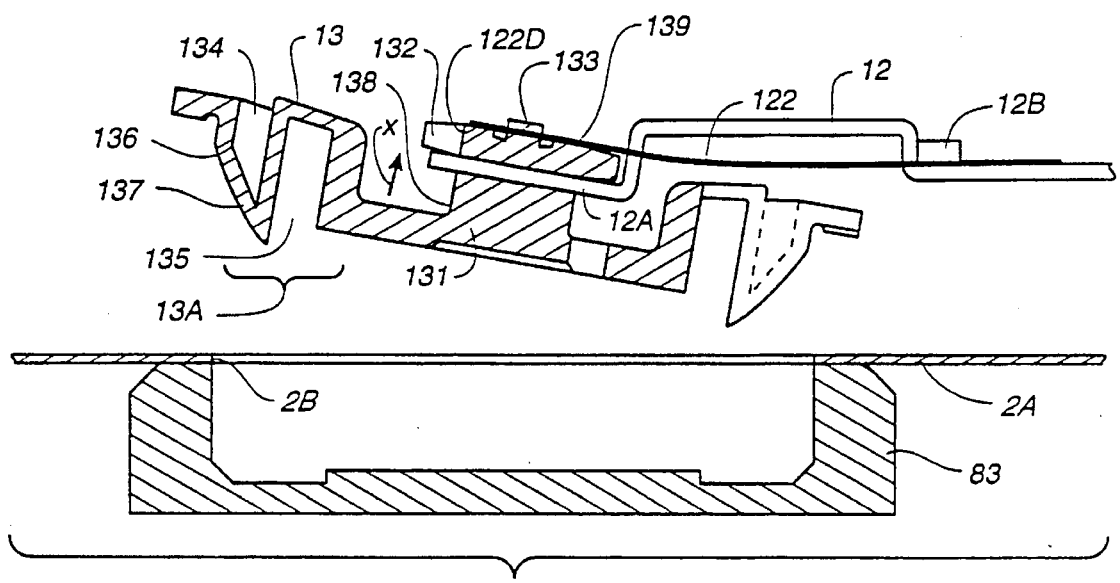
FIG._5
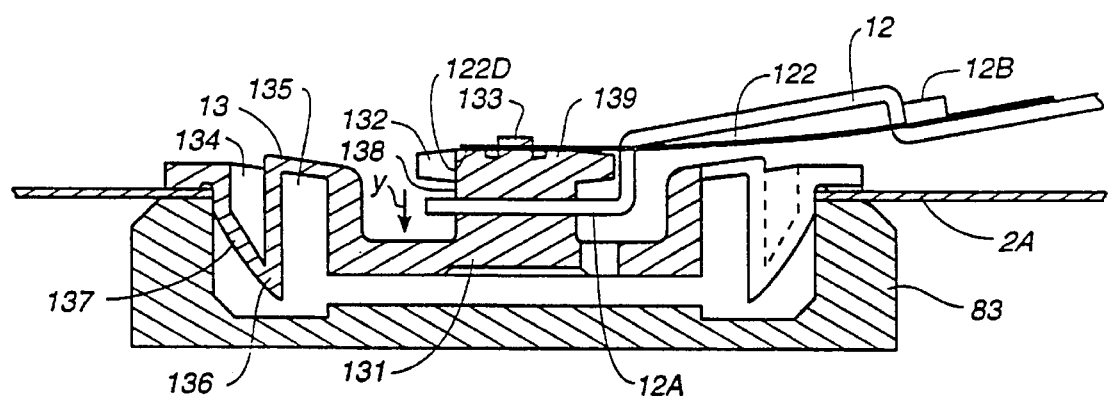
FIG._6

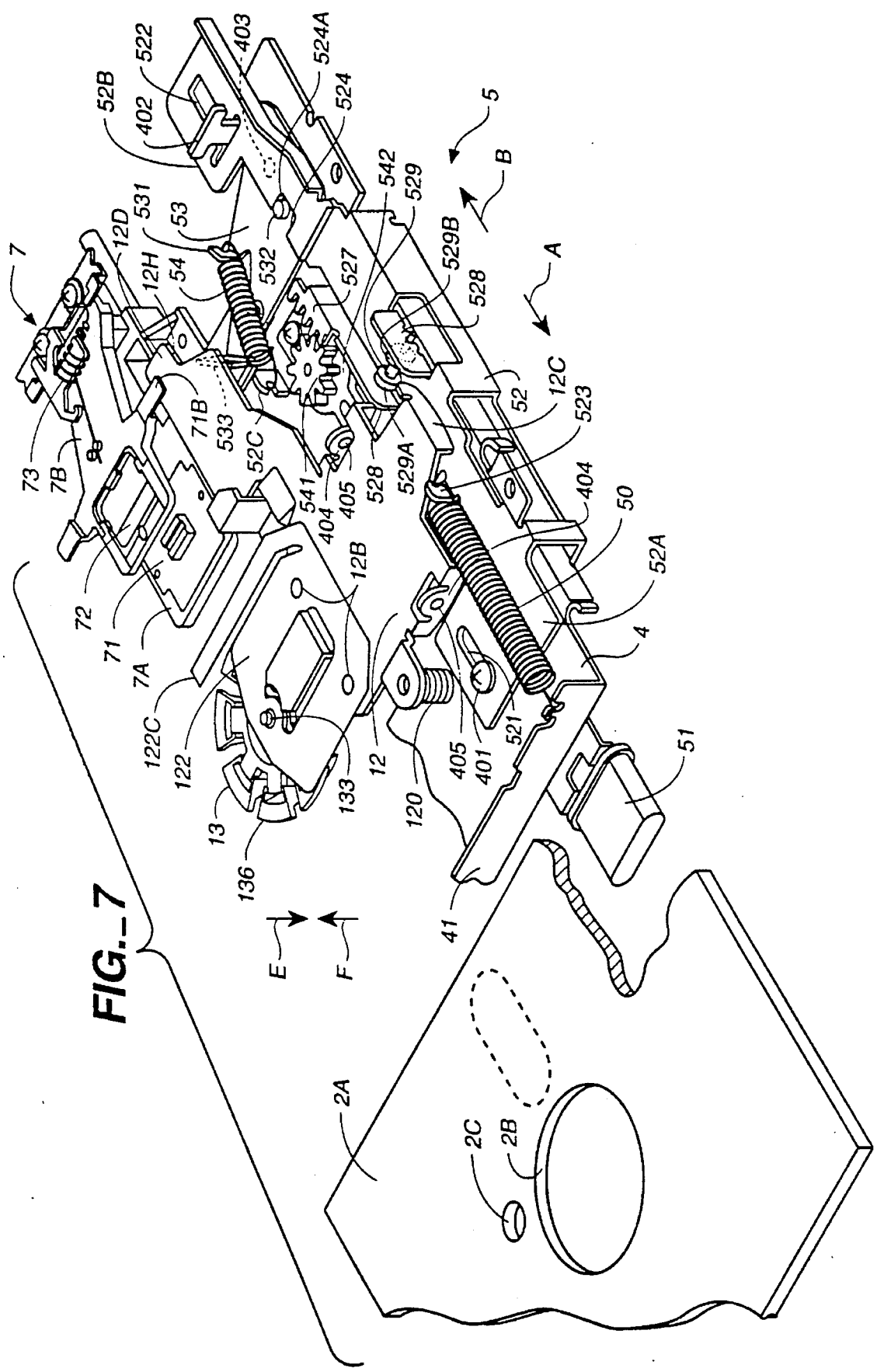

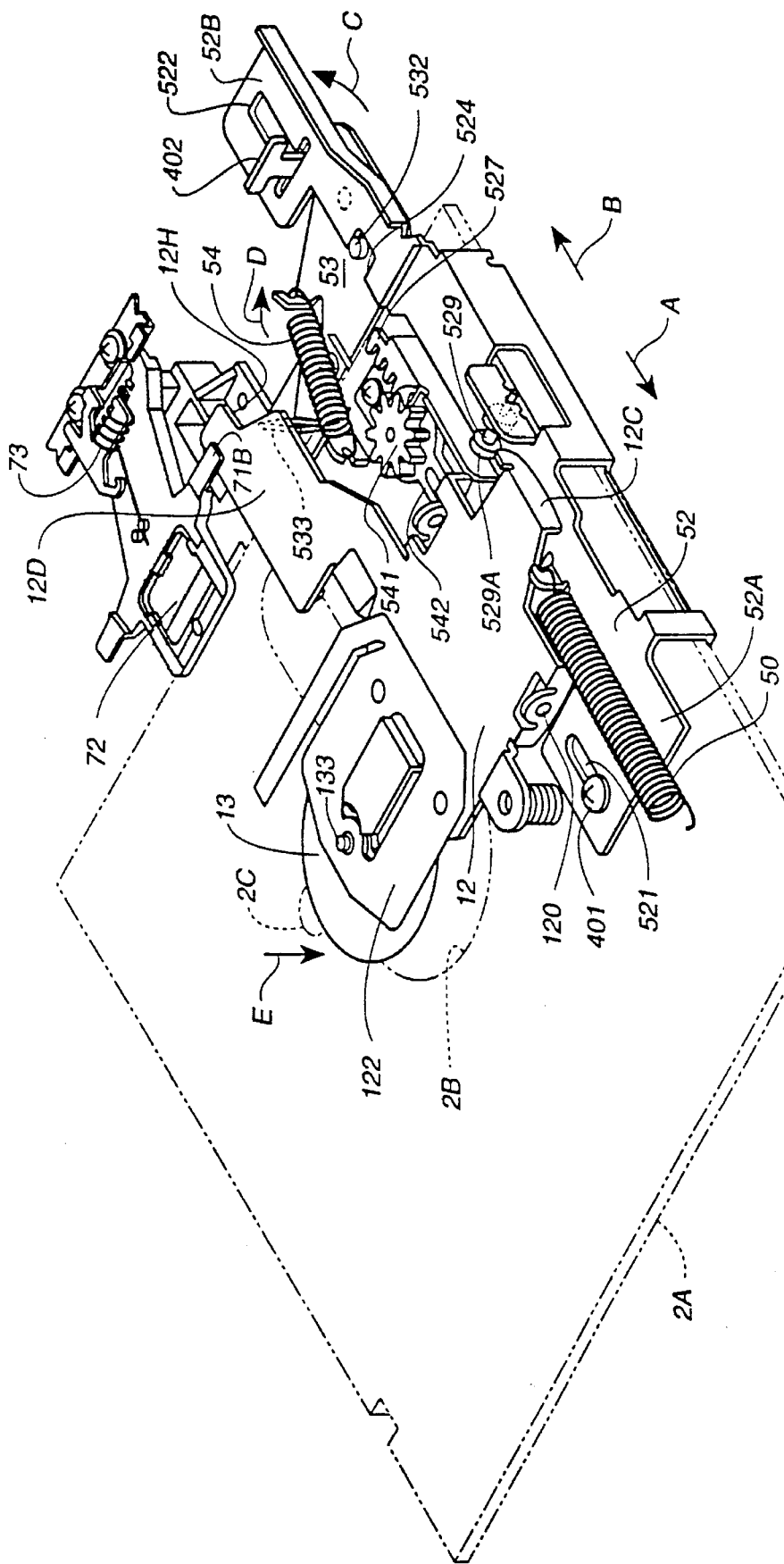
FIG._8

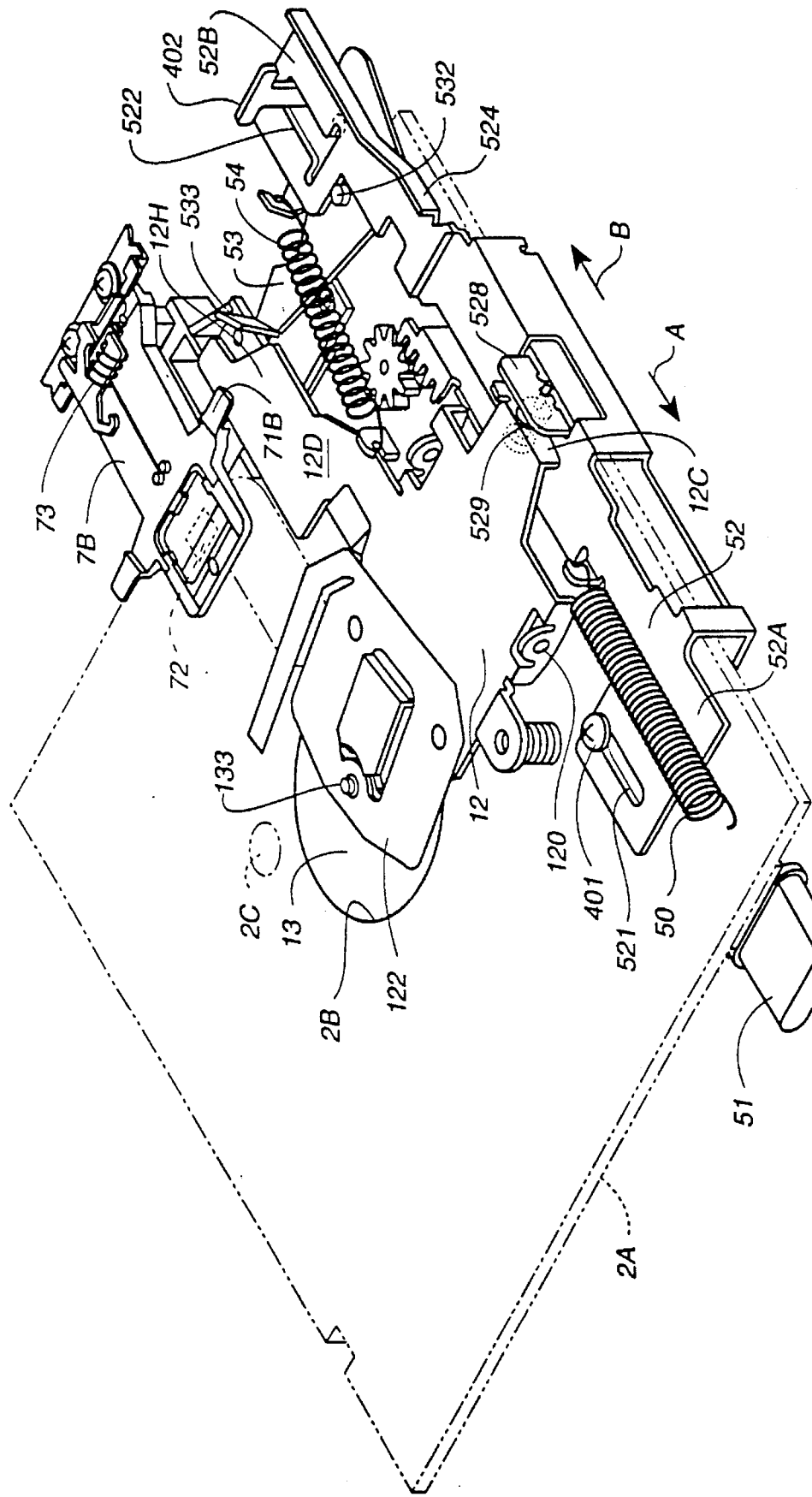
FIG._9

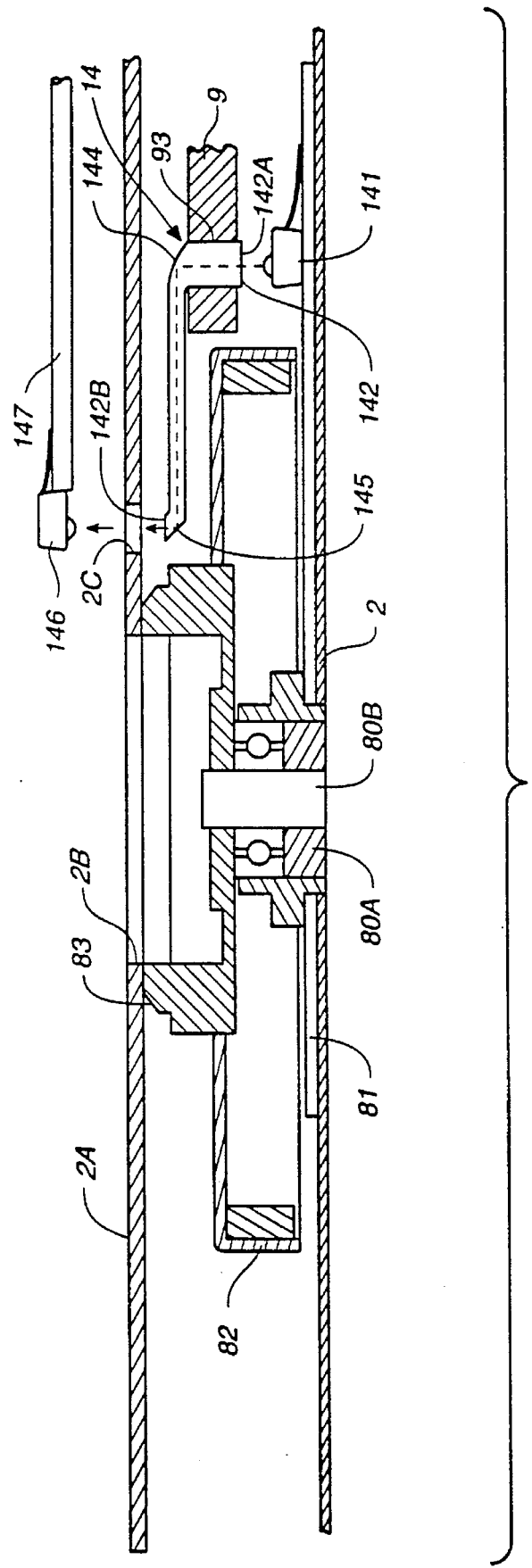

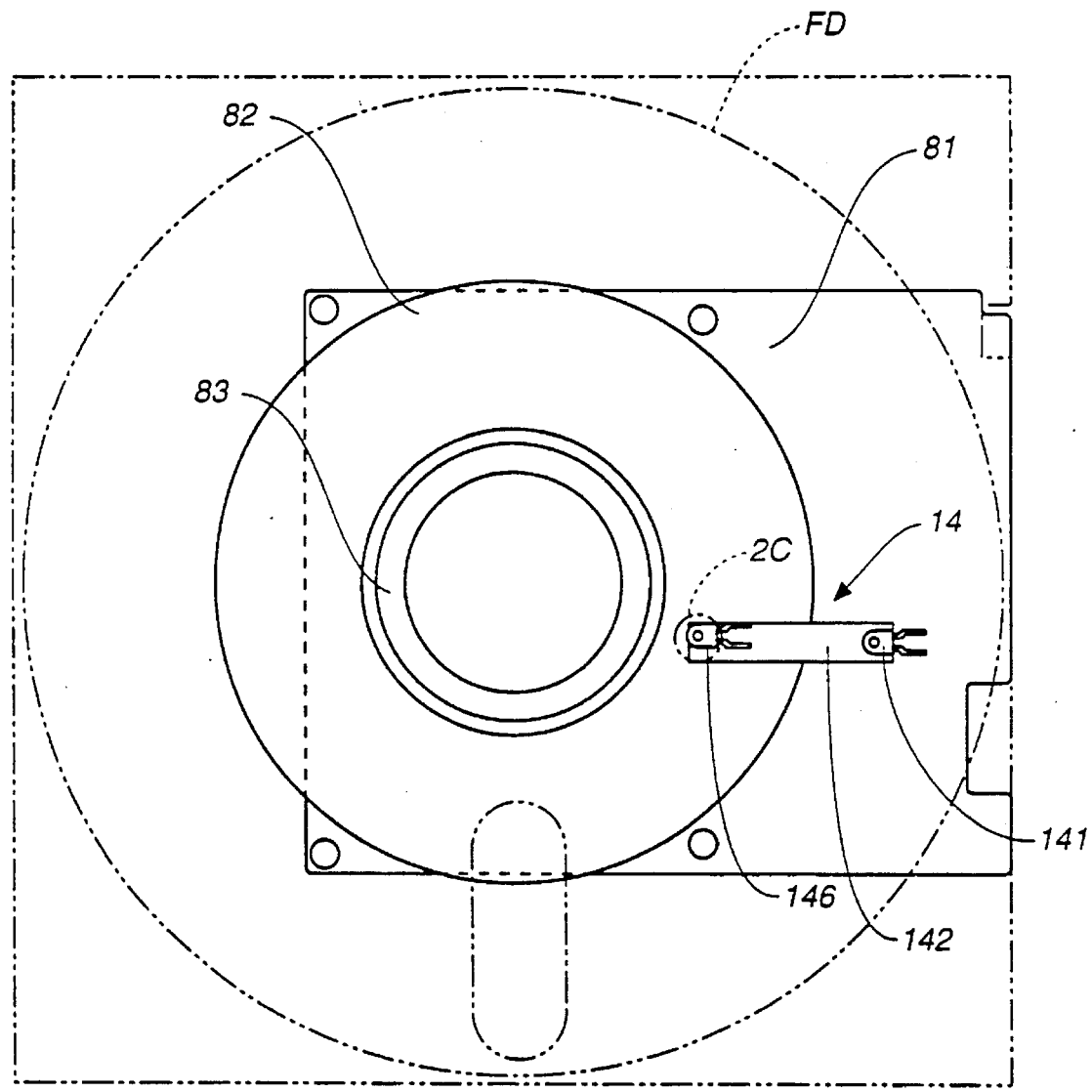
FIG._11

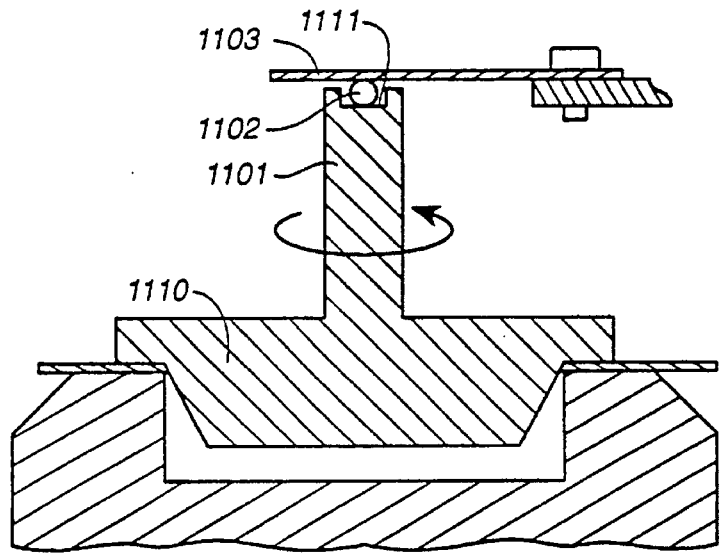
FIG._12
(PRIOR ART)
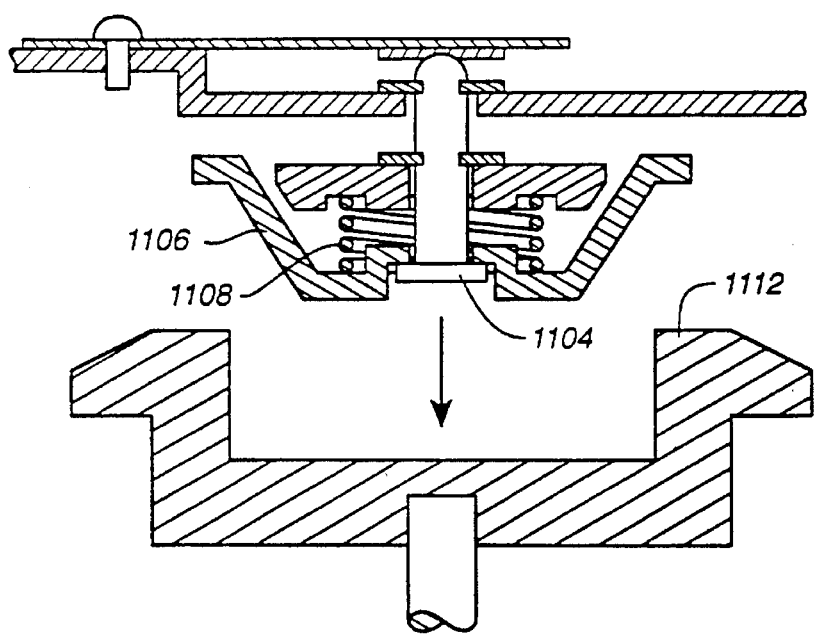
FIG._13
(PRIOR ART)
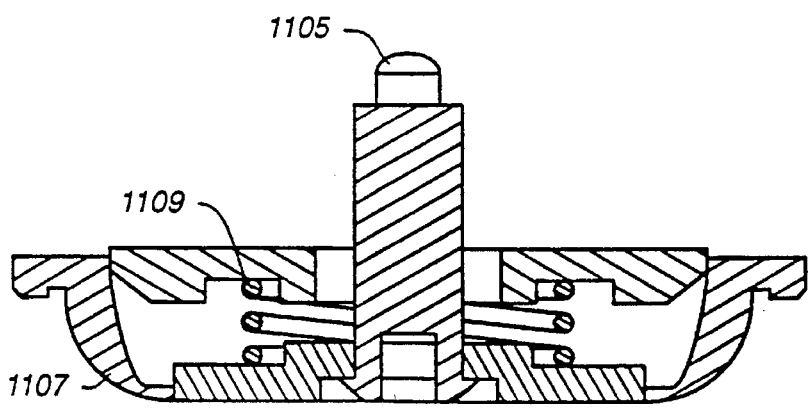
FIG._14
(PRIOR ART)

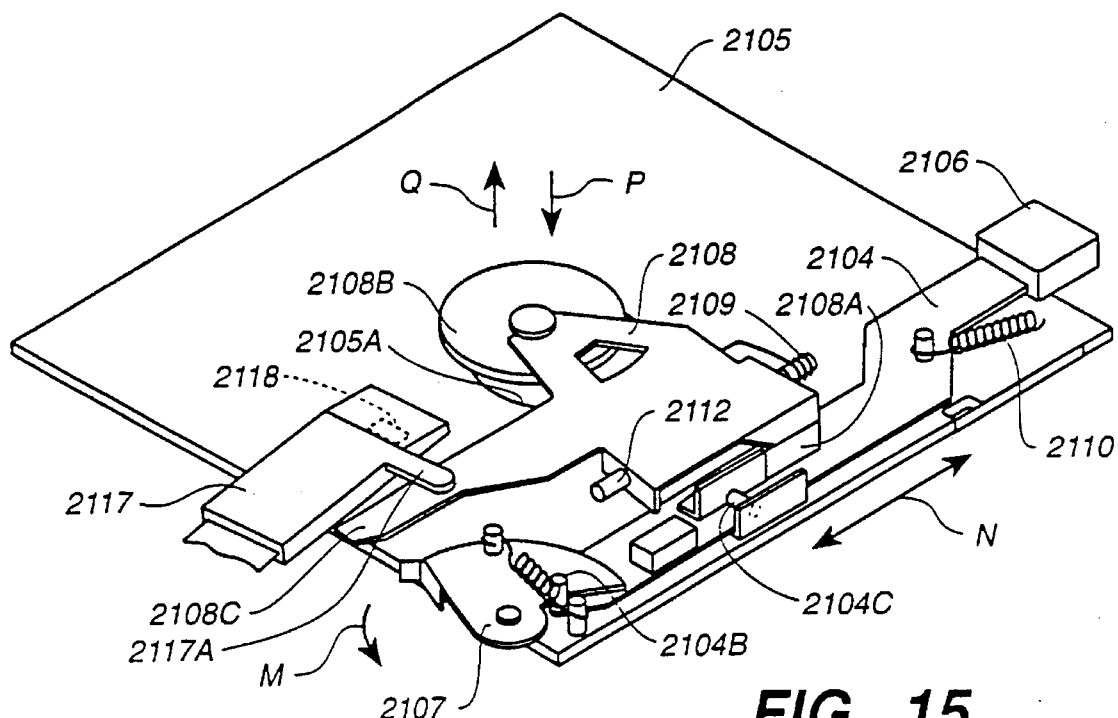
FIG._15
(PRIOR ART)
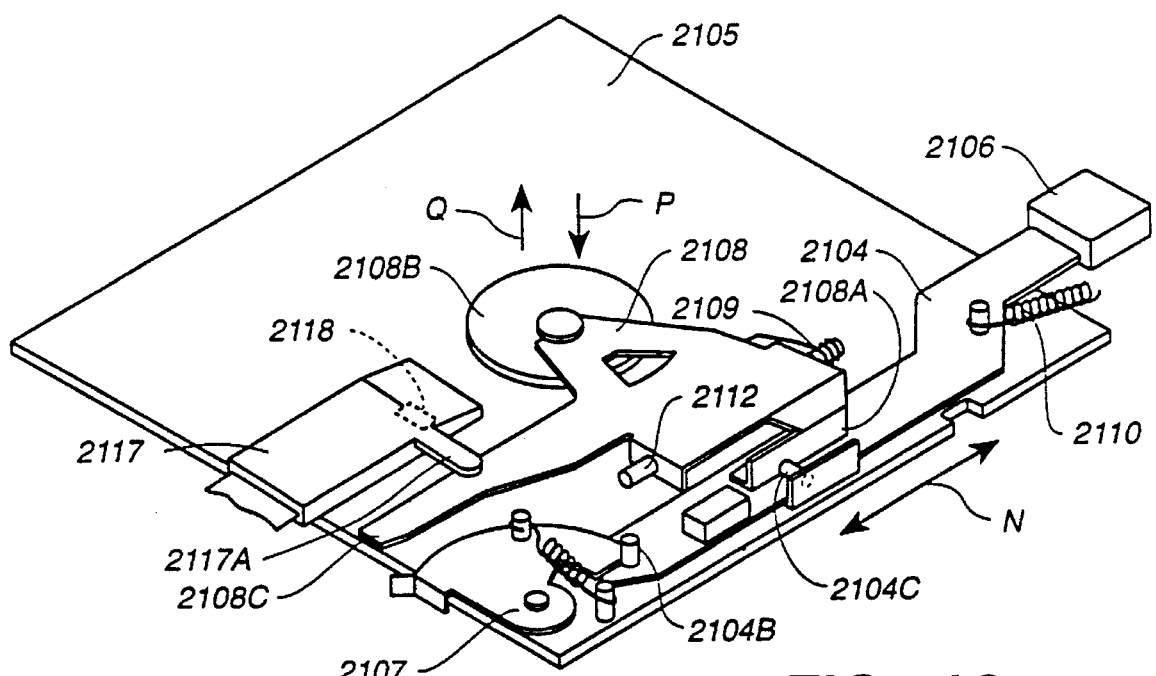
FIG._16
(PRIOR ART)

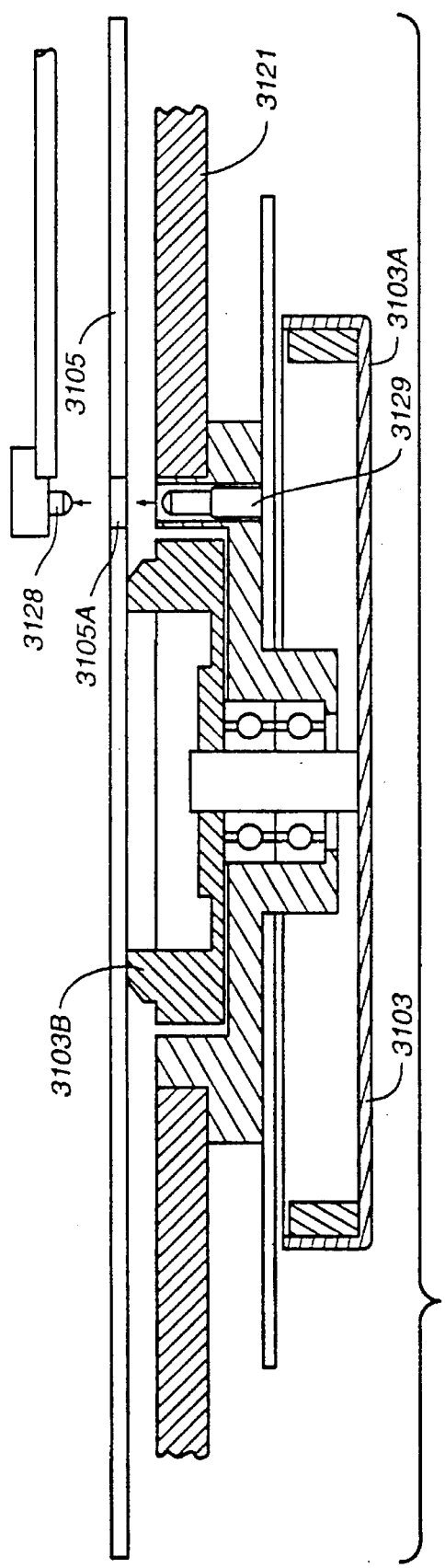
FIG._17
(PRIOR ART)
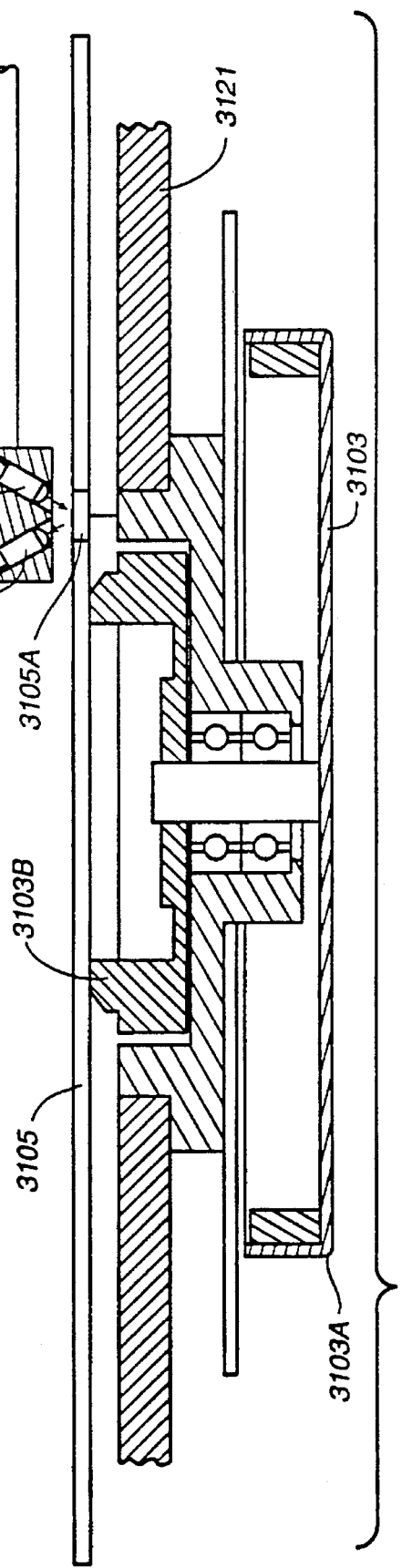
FIG._18
(PRIOR ART)

1

INFORMATION RECORDING/REPRODUCING DEVICE WITH A CLAMPING MECHANISM HAVING A COLLET ASSEMBLY PROVIDING A REDUCED PROFILE HEIGHT

BACKGROUND OF THE INVENTION

1. Field of the Invention

This invention relates to an information recording/reproducing device, such as, a magnetic recording device or an optical recording device and more particularly to an information recording/reproducing device having a reduced cross sectional configuration and a miniaturized design for use in compact computers systems or other such devices, for example, laptop computers.

2. Description of the Prior Art

The most typical information recording/reproducing device utilized at the present time is a magnetic recording/ reproducing device, which contains a loading/unloading mechanism for receiving a recording medium inserted through a medium inlet or slot for placement of the medium inside the device and discharge of the recording medium from the device in response to a computer command or an externally applied command, a medium support section in a medium driving mechanism located on one side of the recording medium, and a clamping mechanism equipped with a collet which clamps the recording medium to the medium support section through a center hole in the medium. A conventional clamping mechanism for such an information recording/reproducing device is shown in Japanese Utility Model Laid-Open No. 174052/1986 and illustrated, in part, in FIG. 12, wherein conical collet section 1110 is provided at one end of rotational shaft 1101 and is positioned in a central opening or hole of the medium. At the other end of shaft 1101 is indent 1111 in which is placed ball 1102. Ball 1102 is retained in indent 1111 by the force of spring 1103, which forcibly retains conical section 1101 in the medium hole during rotation of the collet by hub 1112. Variations of collet structures are shown in FIGS. 13 and 14. In FIGS. 13 and 14, the clamping mechanism is provided with a hollow body collet 1106 or 1107 with corresponding springs 1108 and 1109 for forcibly coupling of the collet structure with its respective shaft 1104 or 1105 so that the collet will be in rotational relationship with the shaft upon rotation of the clamped recording medium and hub 1112. These structures are disclosed in more detail, respectively, in Japanese Utility Model Laid-Open No. 37944/1989 and Japanese Patent Laid-Open No. 177052/1990.

However, with respect to these types of clamp mechanisms, a number of parts are utilized, including the addition of a collet stop ring, as assembled, and rendering it difficult to miniaturize such a structure from both a mechanical operational and structural sense as well as being incapable of reduced in cross sectional configuration to design a more compact disc drive. Moreover, due to the number of parts that are required for assembly, the assembly of such mechanisms is labor intensive and time consuming. Also, a high degree of dimensional accuracy is required for each part for precision fitting in their assembled relationship and for continuous reliable operation.

FIGS. 15 and 16 illustrate a conventional interlocking loading/unloading mechanism and a magnetic head lifting and lowering mechanism in a conventional information recording/reproducing device, which are shown in detail in Japanese Patent Publication No. 21263/1992. These mechanisms comprise slide member 2104, having exposed operating portion 2106 on one end of the member, which is provided on a base support (not shown) so that member 2104 can move back and forth on the base support. Pin member 2104B is provided at the other end of side member 2104 for interengagement with trigger member 2107. Clamping member 2108 is rotatable about horizontal rod shaft 2112, and has collet 2108 for insertion in medium hole 2105A of medium 2105. Also, magnetic head 2118 is supported on carriage arm 2117 which is moved radially indexed relative to the radial extent of recording medium 2 105.

When magnetic recording medium 2105 is inserted into the recording /reproducing device, trigger member 2107 is rotated in the direction indicated by arrow M in FIG. 15. As a result, slide member 2104 is released from trigger member 2107 and, therefore, member 2104 slides in the direction indicated by arrow N due to the tension of spring 2110. Roller 2104C on slide member 2104, in turn, pushes cam 2108A of clamping member 2108 upwardly so that clamping member 2108 is rotated about shaft 2112 in the direction indicated by arrow P and, as a result, magnetic recording medium 2105 is clamped by collet 2108B due to its insertion into medium hole 2105A. Relative to carriage arm 2117, connecting bar 2117A is supported by arm portion 2108C of clamping member 2108. Therefore, as arm portion 2108C descends with the engagement of collet on medium 2105, carriage arm 2117 is also lowered, and magnetic head 2118 of arm 2117 comes into engagement with the surface of magnetic recording medium 2105.

In the connection with the lowering of clamping member 2108, member 2108 is generally biased in an upward direction, indicated by arrow Q, by means of spring 2109. However, the center of gravity of clamping member 2108 is offset relative to rotational point so that the member can pass a point of rotation where its weight sufficiently counteracts the force of spring 2109. Thus, if initially sufficient force is applied to clamping member 2108 when magnetic recording medium 2105 is absent from the device, member 2108 has a tendency to rotate in direction P on account of its own weight, i.e., it is sufficiently counterbalanced against the force of spring 2109, so that carriage arm 2117 will also rotate in direction P. As a result, magnetic head 2118, generally comprised of a ceramic material, may accidentally bump or make contact against its companion magnetic head, positioned in opposite facing relationship to head 2118 (not shown), resulting in head damage. If data recording is subsequently performed upon insertion of magnetic recording medium 2105 when the magnetic head has so damaged, the medium recording surface may be damaged as well. As a result, recorded data will be correspondingly destroyed or, otherwise, rendered in unreadable form. Because of this problem, a locking mechanism may be provided for locking clamping member 2108 into position to prevent its movement when medium 2105 has not been inserted into the device. Such a locking mechanism requires additional parts in the load/unload mechanism, which, of course, requires additional assembly. With more assembled parts, it is difficult to imagine any possibility of further miniaturization of these disc drives, let alone rendering them of thinner cross sectional contour for more compact, value added assembly, e.g., in a small laptop type of computer assembly. Moreover, additional time is required for assembly rendering the resulting device more labor intensive and of greater manufacturing cost.

Relative to another aspect of an information recording/ reproducing device, the rotational position of the recording medium is generally detected by detected timing based upon the employment of a timing hole formed in the magnetic recording medium which passes between a light source and a light detector. Such a standard position detection mechanism is illustrated in FIG. 17, and comprises light emitter 3129 and photodetector 3128, respectively, positioned in opposed facing relation respectively beneath and above recording medium 3105, which is rotated by motor 3103. The arrangement of light emitter 3129 beneath medium 3105, however, requires the maintenance of sufficient space at this location relative to motor 3103 to provide physical space for containing emitter 3129. Thus, miniaturization and cross sectional reduction of the device cannot be realized without some way of eliminating or otherwise reducing the requirement for this emitter space.

As shown in FIG. 17, hub 3103B and rotor 3103A of motor 3103 provide for rotational movement of magnetic recording medium 3105. When these two components are respectively positioned in the upper and lower portions of chassis 3121, it is possible to maintain sufficient space for light emitter 3129 in a portion of chassis 3121. However, in order to miniaturize the size of the device and reduce the height of motor 3103 as well as simplify the assembly process, both hub 3103B and rotor 3103A may be placed on the same chassis surface with rotor 3103A positioned directly beneath and in close proximity to magnetic recording medium 3105. However, the required space for emitter 3129 is eliminated by such a design. A solution for this shown in FIG. 18 wherein light emitter 3129 and photodetector 3128 are positioned on the same or upper side of magnetic recording medium 3105. In this arrangement, detection of the rotational passage of detection hole 3105A is determined by the difference between the level of reflecting light from the surface of the magnetic recording medium 3105 as compared to reflecting light from opening or hole 3 105A. In this configuration, however, the rotational passage of detection hole 3105A cannot guaranteed 100% detection due to different and varying surface conditions of the magnetic recording medium. As a result, reliability of this timing approach is not fully effective.

Thus, a principal object of the present invention is the provision of an information recording/reproducing device that takes advantage of a design that permits structural miniaturization as well as a reduction in cross sectional thickness providing for a more compact assembly with simplified assembly and a reduced number parts required in the final assembly.

SUMMARY OF THE INVENTION

According to this invention, an information recording/ reproducing device comprises a medium driving mechanism to rotatably drive a recording medium, and a clamping mechanism for clamping a recording medium in a medium support section of the medium driving mechanism. The clamping mechanism includes a collet for insertion into the center hole of the recording medium and is provided with a shaft, comprising the center of rotation of the collet, integrally formed with the back of the collet. A collet supporting member supports the collet at its shaft and is adapted for moving the collet from a standby position to a clamping position for securing the recording medium for rotational movement with motor hub of the drive motor. Collet retaining member is provided with the collet supporting member to permit sliding movement of collet supporting member relative to the collet shaft which permits the collet to be placed in a state of higher degree of rotational freedom when the collet is lowered and placed in its medium clamping position.

The clamping mechanism of this invention requires only three major components comprising the collet, the collet supporting member and the collet retaining member, so that the assembly of these components can be easily accomplished without any securing component, such as, a fastener, and are designed to provide a collet structure of lower height so that the assembled structure permits a recording/reproducing device of reduced cross sectional configuration.

In the description of this invention, the term "information recording/reproducing device" refers to a device having either a recording function for recording data or information onto a recording medium or a reproducing function of reading or playback of data or information from a recording medium, or a device capable of performing both of these functions.

In the preferred embodiment of this invention, the collet is provided with an integral shaft with a rim member formed on its other end which extends radially outward relative the collet shaft so that the collet retaining member can maintain a constant bias on the collet shaft from the upper end of the rim member, while also functioning as a collet supporting and holding means, in combination with the collet supporting member, to securely hold and retain the collet on the collet supporting member. Thus, in the standby position, the collet is held secure by the collet rim member in a clamped arrangement between the collet supporting member and the collet retaining member. Under these circumstances, the collet is held in a fairly rigid and fixed condition so that deviation of the posture and position of the collet is prevented.

Furthermore, the collet supporting member is provided with a supporting portion for loosely surrounding at least a part of the shaft of the collet so that, in the standby position, the upper surface of the supporting portion directly contacts and supports the lower side of the rim member. The supporting portion may be a bifurcated prong member as illustrated in the preferred embodiment. However, the supporting member can also take on other forms that loosely fit about a portion of the shaft of the collet. In the provided embodiment, a projection is provide on the top or outside surface of the rim member and the collet retaining member is provided with an opening or deviate into which the rim projection is placed. The collet retaining member is of thin flexible configuration functioning, in part, as a bias means on the top of the rim member while retaining the collet from laterally deviating, i.e., the collet retaining member holds the collet from separating away from or laterally shifting relative to two support members while the collet supporting member holds the collet for supported rotation movement with the clamped recording medium. With this structure, the frictional rotational resistance of the collet is significantly reduced through the employment of three relatively simple cooperating parts that are easily assembled and securely held in assembled relation. When the collet is placed in its clamping position and the clamping of the medium to the motor hub is accomplished, the collet supporting member has also moved relative to the collet shaft so that its upper surface is no longer in engagement with the underside of the collet rim member. As a result, the collet is enabled to laterally shift slightly relative to the rigidly supported collet supporting member, permitting accurate alignment and positioning of the collet conical clamping portion relative to the medium hole and motor hub receiving recess. Moreover, the collet is in a condition for reduced frictional rotation since the collet supporting member is no longer in engagement with the collet rim member. The frictional contact is reduced and occurs only at the surface region between the collet retaining member and the upper or outer surface of the collet rim member. A spacer having high lubricating properties may be positioned between the rotating surfaces of the collet retaining member and the collet rim member to further frictional drag.

Another aspect of this invention relates to the provision of a locking mechanism for the magnetic head transfer mechanism. The device includes a loading/unloading mechanism for holding the recording medium after the medium has been inserted through the medium input slot of the device, and provides for ejection of the recording medium in response to an externally applied operation, a clamping mechanism for clamping the recording medium to a medium support section of the medium driving mechanism, a medium driving mechanism for rotatably driving a clamped recording medium, and a magnetic head lifting and lowering mechanism which moves a magnetic head from its standby position to its operational position. The loading/unloading mechanism includes a side member in combination with a trigger member which is acted upon by the recording medium when the recording medium is either inserted or ejected from the recording/reproducing device. The displacement of the trigger member is transmitted, via the slide member, to the clamping mechanism and also to the head transfer mechanism by means of the displacement of a motion transfer member. Furthermore, a locking mechanism, preventing movement of the counterbalanced head support arm when the recording medium is not present in the device, is included as a part of the trigger member so that the downward movement of the clamping mechanism and the head transfer mechanism is prevented by the locking mechanism. In this case, it is preferred that the trigger member and the motion transfer member are mounted on a same base support so that they can be assembled and replaced as a single unit. Furthermore, it is preferred to assemble the medium transfer mechanism, the loading/unloading mechanism and the clamping mechanism on a single base support improving the assembly accuracy and cooperative relationship of these mechanisms. In another aspect of this invention, a position detection mechanism is provided for detecting the rotational position of the rotated recording medium to derive an appropriate timing signal. The position detection mechanism comprises an light emitting component and a light detecting component. A thin contour light guide member is provided between the light emitting and light detecting component and has internally reflecting surfaces so the physical length of the light guiding member between these light emitting and detecting components is rendered small while the light path is comparatively longer due to change of the light path direction within the light guide member by means of the internally reflecting surfaces. Thus, the light guide member which can be positioned in a narrower space between the motor rotor and the clamped medium. Therefore, with the use of such a light guide member, a reduced height motor mounted on one side of the chassis can be realized reducing the overall height of the disc drive for use in compact assembly configurations. Especially when, as the medium driving mechanism, for the purpose of miniaturizing and reducing the height of the mechanism while facilitating its assembly, a motor is employed in which both a medium support section and a rotor for rotating the medium support section are placed on same side of the chassis supporting the medium driving mechanism. As a result, the rotor is positioned directly beneath the recording medium leaving a much smaller space between the medium and the motor rotor. However, there is sufficient space for the light guide member thereby accommodating the standard detection system, as shown in FIG. 17, providing for a reduction in the overall necessary height of the information recording/reproducing device.

Thus, in the preferred embodiment of this invention, an information recording/reproducing device is provided with a combination comprising an improved medium position detection system, clamping mechanism and locking mechanism for the head transfer mechanism of the device.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 is an exploded perspective view of a lower portion of an information recording/reproducing device according to an embodiment of this invention.

FIG. 2 is an exploded perspective view of an upper portion of an information recording/reproducing device according to an embodiment of this invention.

FIG. 3 is an exploded perspective view of a medium driving mechanism of the recording device shown in FIG. 1.

FIG. 4 is an exploded perspective view of a clamping mechanism of the recording device shown in FIG. 2.

FIG. 5 is a cross sectional view showing the standby position of the clamping mechanism shown in FIG. 4.

FIG. 6 is a sectional view showing the operation position of the clamping mechanism shown in FIG. 4.

FIG. 7 is a perspective view of the medium loading/unloading mechanism of the recording device shown in FIG. 2.

FIG. 8 illustrates the operation for loading a recording medium in the loading/unloading mechanism of FIG. 7.

FIG. 9 illustrates the completed state of a loaded medium in the loading/unloading mechanism of FIG. 7.

FIG. 10 is a cross sectional view of the structure for a position detection mechanism of the recording device shown in FIG. 1.

FIG. 11 is a plan view of the structure for the position detection mechanism shown in FIG. 10.

FIG. 12 is a cross sectional view of a clamping mechanism employed in a conventional recording device.

FIG. 13 is a cross sectional view of a structure for the clamping mechanism in another conventional information recording/reproducing device.

FIG. 14 is a cross sectional view of another structure for the clamping mechanism in a further conventional information recording/reproducing device.

FIG. 15 illustrates the operation for loading a recording medium into a loading/unloading mechanism of a conventional information recording/reproducing device.

FIG. 16 illustrates the completion of loading of the recording medium in the conventional loading/unloading mechanism of FIG. 15.

FIG. 17 is a cross sectional view of a standard structure for a position detection mechanism utilized in a conventional information recording/reproducing device.

FIG. 18 is a cross sectional view of another standard structure for a position detection mechanism utilized in a conventional information recording/reproducing device.

DETAILED DESCRIPTION OF PREFERRED EMBODIMENT

Overview

Reference is now generally made to FIGS. 1–2. Information recording/reproducing device 1 comprises chassis 2; a front bezel 31 for attachment to the front of chassis 2, having medium inlet slot 31A; base support 4, mounted on chassis 2; and bracket 32 for attachment to the side of chassis 2 for assembling device 1 in a computer or the like. A cover plate (not shown) is provided for covering chassis 2 and base support 4 mounted on chassis 2.

Chassis 2 includes a medium driving mechanism 6 which supports for rotation and rotates a magnetic recording disc or recording medium 2A, and a carriage or head moving mechanism 7 having first and second magnetic heads 71 and 72 to record and reproduce information relative to rotating magnetic recording medium 2A. Further, step motor 70 drives carriage mechanism 7 so as to move first and second magnetic heads 71 and 72 in a radial direction relative to the radial extent of magnetic recording medium 2A. Circuit board 1C includes a circuit to control the operation of recording device 1 and is assembled on chassis 2. A clamping mechanism 6A, supported on base support 4, properly positions magnetic recording medium 2A in medium driving mechanism 6, and a loading/unloading mechanism 5 loads magnetic recording medium 2A in medium driving mechanism 6 and unloads medium 2A from driving mechanism 6. Medium driving mechanism 6 and loading/unloading mechanism 5 are assembled on base support 4.

Medium Driving Mechanism 6

As shown in FIG. 3, chassis 2 has, on side 20, cut out portion 21 and at least one tapped hole for fixing bracket 32 to side 20. Chassis 2 has aperture 23 on bottom 24. Bearing 80A (FIG. 10) of rotational shaft 80B of motor 8 on motor base 81 is press fit into aperture 23. Rotor 82 of motor 8 covers a stator (not shown) fixed on motor base 81. In the top center of rotor 82, a cylindrical hub 83 projects upward constituting a medium support section. Frame 9, which may be constructed of plastic material, is secured to chassis 2 to cover motor 8. Frame 9 has aperture 91 through which hub 83 extends. Cutout portion 92 provides a place for mounting carriage mechanism 7. Cutout portion 93 provides a place for mounting light guide member 142 of position detection mechanism 14 to detect the rotational position of magnetic recording medium 2A.

The height of motor 8, as best seen in FIG. 10, is materially reduced over the conventional disc drive motor, e.g., by 35%, because motor rotor 82 and hub or pulley 83 are directly connected. As an example, the conventional motor height is about 20.8 mm, whereas the height of motor 8 is about 13 mm.

Recording Medium Clamping Mechanism 6A Reference is now made to further details of device 1 relative to detailed views of FIGS. 4–6, which are enlarged portions of the device as generally illustrated in FIGS. 1 and 2. FIG. 4 is detailed view of clamping mechanism 6A. FIG. 5 is a detailed view illustrating the standby position of clamping mechanism 6A. FIG. 6 is a detail view illustrating the clamping position of clamping mechanism 6A. As shown in FIGS. 4–6, clamping mechanism 6A, supported on base 4, comprises collet 13; collet bar 12 having a yoke shaped or bifurcated end portion 12A formed by cutout 12F for supporting collet 13; and collet spring or retaining member 122 having an associated leaf spring 122C. Collet retaining member 122 is secured to the top surface of collet bar 12 by means of two small projections 12B formed on bar 12 which are force fit into two apertures 122B formed in collet retaining member 122.

As best shown in FIGS. 4–6, collet 13 has a collet shaft 131 which is the center of rotation for the collet. Rim member 132 is formed integrally on the upper end of collet shaft 131, and collet periphery portion 134 is formed integrally on the lower end of collet shaft 131. Thus, as best seen in FIG. 5, an outer periphery portion 13A of collet 13 has a large diameter and is formed at the lower portion of shaft 131. Thus, shaft 131 is surrounded by a recessed portion 138 constituting a separation between outer periphery portion 13A and rim member 132.

The outer diameter of shaft 131 is designed to be smaller than the internal width of cutout 12F formed in collet bar end so that collet bar end 12A is enabled to loosely support collet 13 in recessed portion 138 on shaft 131, as best seen in FIGS. 5 and 6.

The outer region of collet outer periphery portion 13A comprises a plurality of elastomeric finger segments 136 defined by a plurality of separating cutouts 136A. As seen in the detail of FIGS. 5 and 6, each segment 136 comprises a lower section 137 which is tapered so that it will easily fit into center hole 2B of magnetic recording medium 2A and also within the confines of hub 83. Each segment 136 is independently flexible and has upwardly extending groove portion 134 and a downwardly extending groove portion 135 so that each finger segment 136 exhibits a high degree of flexibility and resiliency. Collet 13 can be easily formed as an integral molded piece forming groove portions 134 and 135, cutouts 136A and recessed portion 138.

Collet bar end portion 12A and collet retaining member 122 support collet 13 by holding rim member 132 of collet 13 respectively from lower and upper sides thereof. Projection 133 is formed centrally on the upper end of rim member 132, and is designed to mate with hole or indent 122A of collet retaining member 122. The outer diameter of projection 133 is of smaller dimension than the inner diameter of collet retaining member hole 122A so that projection 133 fits loosely within hole 122A, permitting free rotation of collet 13 relative to its support via collet bar 12 and its associated retaining member 122. Moreover, since the spacing between bifurcated tips 12A of collet bar 12 and shaft 131 of collet 13 is wider than that between projection 133 and hole 122A, collet 13 is able to move laterally within a prescribed but limited range relative to collet bar 12 and its associated retaining member 122.

Alternatively, projection 133 may be formed on a formed side portion of collet retaining member 122 rather than its top surface portion and, correspondingly, an opening or indent for receiving projection 133 may be formed on a side portion of collet 13. Moreover, a spacer with high lubricating properties may be inserted between rotating engaging surfaces 139 and 122D of collet 13 and collet retaining member 122, respectively, to lower the frictional contact between these moving parts.

As seen from FIGS. 5 and 6, end portion 12A of collet bar 12 is formed to be slightly bent upward relative to the plane of the collet bar body. Collet bar 12, being of thin cross section, can be flexed providing some spring action for collet 13.

Relative to collet assembly, after bifurcated end portion 12A of collet bar 12 is positioned on collet shaft 131, collet retaining member 122 is secured to the top of collet bar 12 by means of force fit relative to projections 12B. During this process, projection 133 of collet 13 is positioned into hole 122A of collet retaining member 122. As a result, the forward end portion of collet retaining member 122 is flexed upwardly supporting collet 13 in a stable manner by firmly holding collet rim member 132 between collet retaining member 122 and collet bar bifurcated end portion 12A.

As shown in FIG. 6, when collet bar 12 is lowered, segments 136 of collet 3 flex and are forcibly fit into center hole 2B of magnetic recording medium 2A and are partially inserted into the interior of hub 83. At the same time, bifurcated end portion 12A of collet bar 12 moves downward in the direction Y relative to collet shaft 13 1, releasing collet 13 from a state wherein collet rim member 132 is held firmly secure between bifurcated end portion 12A and collet retaining member 122. Accordingly, collet 13 is in a condition for enhanced free rotation with hub 83 and magnetic recording medium 2A. This is because retaining member 122 and collet bar end portion 12C are not held in firmly on collet rim member 132. During rotation of collet 13, as positioned in FIG. 6, the lower surface of collet retaining member 122 applies a continuous force on the upper surface of collet rim member 132 while permitting some lateral movement for collet 13 and medium 2A during their rotational movement to compensate for tolerances between these separate parts. Also, this tolerance permits lateral alignment of collet 13 relative to hub 83 when placed in its clamping position. The structure of collet 13 is of smaller height than conventional collets. Conventional collet heights are about 9.2 mm and collet 13 is about 7.4 mm. However, the overall reduction in height comes with the collet support assembly in combination with the collet, i.e., collet 13 being supported at its mid-section along shaft 138 with the bifurcated end portion 12A of collet bar 12, rather than through coupling relative to its top surface 139, and the utilization of a bent or offset portions 12X and 12Y in collet bar 12 to planarize the profile height of the assembly comprising collet 13 and collet bar, as best seen in FIG. 5. In this case the conventional collet and collet arm or bar combinations have a profile height of about 10.4 mm. However, in the case of collet 13 and collet bar 12 with the contour of bent portions 12X and 12Y, the profile height is about 7.4 mm, which is about a 30% reduction in profile height over such conventional clamping mechanisms.

Loading/Unloading Mechanism 5

FIG. 7 is a detailed view illustrating the structure of loading/unloading mechanism 5. Loading/unloading mechanism 5 has an operational lever 51 projecting from the front of base support 4. Operational lever 51 is connected to slide member 52. Member 52 has a U-shaped form encompassing an end portion of base support 4. Slide member 52 extends along the full length of base support 4, and is enabled to reciprocally slide back and forth in the directions indicated by arrows A and B, as guided by the edge of base support 4 as well as principally at front region 52A of member 52 by guide pin 401 secured on base support 4 and sliding within elongated aperture 521 formed in member 52, and on back region 52B of member 52 by guide member 402 on base support 4 extending through T-shaped groove 522 formed in member 52. One end of coil spring 50 is fixed to front portion 41 of base support 4, while the other end of spring 50 is fixed to spring post 523, which is integral with slide member 52 and protrudes upward from the planar surface of slide member 52. Thus, coil spring 50 causes member 52 to be generally biased in the direction indicated by arrow A.

Trigger member 53 is positioned between slide member 52 and base support 4 and is rotatably supported by shaft 403 on base support 4 and is located at back region 52B of member 52. Tension spring 54 is connected between spring post 531 of trigger member 53 and spring post 52C of base support 4. Therefore, as shown in FIG. 8, trigger member 53 is generally held in a biased condition about shaft 403 in the direction indicated by arrow C. Engaging cutout 524 is formed in the side of slide member 52. Cam 532 on trigger member 53 engages with the cam-like surface of cutout 524, as shown in FIG. 7, so that movement of slide member 52 in a forwarded direction of arrow A is prevented.

At another end of trigger member 53 is an upwardly extending medium engaging member 533 and is formed to extend beneath collet bar 12. When magnetic recording medium 2A is inserted in device 1, the forward edge of the medium will abut against medium engaging member 533 so that, as shown in FIG. 8, trigger member 53 will be rotated in the direction indicated by arrow D by the forward edge of inserted medium 2A until medium engaging member 533 is moved from beneath and away from collet bar 12. As a result, the cam 532 on trigger member 53 is disengaged from cutout 524 of slide member 52 so that member 52 is now enabled to move in the direction of arrow A.

In order to prevent the rapid movement of slide member 52 in a forward direction due to the force of spring 50, gear rack 527 is formed along one edge of slide member 52, and rotary damper 542, having gear 541 for interengaging with gear rack 527, is secured to base support 4. Rotary damper 542 provides resistance to the rotational movement of gear 54 1 by means of employing the viscosity of oil encapsulated inside damper 542.

When cutout 524 of slide member 52 is released from cam 532 of trigger member 53, trigger member 53 is moved in the direction indicated by arrow D against the force of tension spring 54 and slide member 52 slides in the forward direction of arrow A. A side edge of slide member 52 moves along past cam 532 as member 52 moves forward at a reduced velocity rate by means of the damping effect of damper 542. The amount of travel of slide member 52 in the direction of arrow A is defined by the elongated extent of aperture 52 1 wherein guide pin 401 stops the forward movement when it is at the rearward end of aperture 521, as seen in FIG. 9.

Coupling Between Loading/Unloading Mechanism 5 and Clamping Mechanism 6A

Reference is now made to FIGS. 7–9 for explaining the operation of clamping mechanism 6A relative to operation of the loading/unloading mechanism 5. Collet 13 is lifted and lowered in clamping mechanism 6A employing the forward sliding motion of slide member 52 upon its release from trigger member 53. In this connection, the center of slide member 52 is provided with a pair of upwardly directed support members 528, formed out of member 52, and three rollers 529, 529A and 529B are placed between support members 528. Larger diameter rollers 529A and 529B rotate on the surface of base member 4 thereby providing for smoother reciprocal movement of slide member 52. Smaller diameter roller 529 is positioned between rollers 529A and 529B.

Cam 12C is formed out of collet bar 12 and extends along its side edge. Collet bar 12 is rotatably supported on shaft 405 by members 404 formed out of base member 4 and are bent to extend upwardly. Thus, collet bar 12 is rotatable about shaft 405 in either direction indicated by arrows E or F. In addition, collet bar 12 is generally biased in the direction indicated by arrow F by compression spring 120, the lower end of which is fixed on base member 4.

Thus, to progress from the condition shown in FIG. 8 to the condition shown in FIG. 9, if trigger member 53 is rotated in the direction indicated by arrow D when magnetic recording medium 2A is inserted into device 1, as indicated in FIG. 9, cam 532 on trigger member 53 is released from cutout 524 of slide member 52, and slide member 52 moves in the direction of arrow A, and collet bar cam 12C rides onto and over roller 529, which causes collet bar 12 to rotate about shaft 405 in the direction indicated by arrow E, lowering collet 13 into engagement with hole 2B of medium 2A.

Coupling Between Loading/Unloading Mechanism 5 and Carriage Mechanism 7

Reference is continued with respect to FIGS. 7–9 for explaining the operation of carriage mechanism 7. Carriage mechanism 7 has first and second magnetic heads 71 and 72 in opposite facing relation wherein second magnetic head 72 is aligned above an inserted magnetic recording medium and is lifted and lowered by means of the slide motion of slide member 52. First and second magnetic heads 71 and 72 are, respectively, supported at the forward ends of first and second carriage arms 7A and 7B. At the rear portion of second carriage arm 7B, coil spring 73 provides a biasing force for generally biasing arm 7B in a downward direction of arrow E toward an inserted medium. As is known in the art, in order to record and reproduce information from magnetic recording medium 2A, it is necessary for first and second magnetic heads 71 and 72 to engaged or otherwise be in floating but magnetic engagement with the surface of medium 2A. In the embodiment shown, first magnetic head 71 will engage with the under surface of medium 2A while second magnetic head 72 is lowered onto the upper surface of medium 2A.

Arm-shaped extension 12D of collet bar 12 extends towards carriage mechanism 7 and is positioned below connecting bar 71B, extending from the side of second carriage arm 7B. Thus, when magnetic recording medium 2A is absent from device 1, second magnetic head 72 is held in standby position upwardly against the bias force of its biasing spring 73 because extension 12D, as well as collet bar 12, are in their raised position by means of the force of collet bar spring 120. In this condition, medium engaging member 533 of trigger member 53 is also positioned directly underneath extension 12D, as shown in FIG. 7, preventing any possible downward movement of bar 12 along with carriage arm 7B. On the other hand, when magnetic recording medium 2A is inserted into device 1, medium engaging member 533 is displaced from being directly underneath extension 12D and is moved into the region of notch 12H of collet bar 12 so that it will no longer interfere with the downward movement of collet bar 12 in the direction of arrow E. Thus, as shown in FIGS. 8 and 9, when magnetic recording medium 2A is inserted into the device, collet bar 12 rotates in the direction of arrow E to lower extension 12D. As a result, second carriage arm 7B is lowered by the force of its spring 73, positioning head 72 on the surface of medium 2A. Thus, the lifting and lowering of magnetic head 72 comprises extension 12D of the collet bar 12, second carriage arm 7B, connecting bar 71B in cooperation with the biasing forces provided by springs 73 and 120. The lowering movement of arm 7B is accomplished at a slow rate due to the dampening effects by rotary damper 542 on collet bar 12.

Loading/Unloading Mechanism 5 and Medium Lifting and Lowering Mechanism 10

Reference is again made to FIG. 2 for explaining in detail the lifting and lowering of medium 2A relative to hub 83 in conjunction with the slide motion of slide member 52. Medium transfer mechanism 10 is provided on the back portion of base member 4 and functions to lower an inserted magnetic recording medium 2A to place it on hub 83 of motor 8. A function of mechanism 10 is to protect lower magnetic head 71 from damage upon insertion of medium 2A into device 1. Once, inserted, medium 2A can then be conveniently lowered to hub 83 and for alignment and chucking by collet 13.

Mechanism 10 has a pair of brackets 406 formed by bending upward a portion of base member 4. Brackets 406 rotatably support medium holder 101, which can rotate about point 406A in the manner indicated by arrow 406B. However, because of spring 102, which is connected between holder 101 and bracket 406 at side portion 101A of holder 101, holder 101 is biased in an upwardly direction, as indicated by arrow H, against an adjustable stop (not shown), limiting the amount of upward movement of holder 101. Holder 101 receives an inserted magnetic recording medium 2A on medium supporting arm 101D after which holder 101 is enabled to rotate downward in a direction indicated by arrow G through contact of holder extension 101B by means of collet retaining member leaf spring 122C. In this connection, at side portion 101B of medium holder 101, extended portion 101C is positioned to be aligned beneath the end of leaf spring 122 of collet retaining member 122. Leaf spring 122C is formed as part of collet retaining member 122 by means of a groove cut along one side portion of collet retaining member 122. Thus, when magnetic recording medium 2A is inserted into device 1 and collet bar 12 rotates in the direction of arrow E, leaf spring 122C is forced downwardly on extended portion 101C of medium holder 101 to move medium holder 101 in a downward direction indicated by arrow G so that supporting arm 101D of holder 101 is brought to a level to permit magnetic head 71 to be in engagement with the undersurface of the recording medium as well as magnetic recording medium 2A to be aligned and chucked by collet 13 and motor hub 83.

Medium Position Detection Mechanism 14

Reference is now made to FIGS. 10 and 11 concerning the rotational position detection mechanism for detecting the instantaneous rotational position of recording medium 2A through use of detection hole 2C formed relative to medium 2A. Magnetic recording medium 2A is provided with detection hole 2C at a position offset by a predetermined radial distance from the center of the medium. The rotational passage of detection hole 2C is optically detected by position detection mechanism 14 which provides an output utilized for producing a timing signal. When magnetic recording medium 2A is inserted into device 1, detection hole 2C is positioned above the outer periphery edge of hub 83 and directly above rotor 82. The space between magnetic recording medium 2A and rotor 82 is too small due the compact size of the motor that it is impossible to position in this limited space a light emitting element, wiring components and appropriate assembly for s conventional detection mechanism. However, in the embodiment of this invention, light emitting element or component 141 is placed on motor base 1 at a position adjacent of rotor 82, as shown in FIG. 10. Light guiding pipe or member 142 has one end in substantial optical alignment with light emitting element 141. Member 142 is bent to pass between the small spacing provided between magnetic recording medium 2A and rotor 82 with its other end aligned relative to detection hole 2C. As previously indicated, light guide member 142 is secured in cutout 93 provided in plastic frame 9 that covers motor 8. Since light guide member 142 is bent at right angles at two points, i.e., above emitting element 141 and beneath detection hole 2C, from end 142A to end 142B, internal reflecting portions 144 and 145 in member 142 guide the light along a pathway directly from emitting element 141 to detection hole 2C. The light passing through detection hole 2C is received by detector element or component 146 positioned directly above magnetic recording medium 2A and aligned relative to detection hole 2C and member end 142B. Detector element 146 is supported from member 147 and provides as an output for a timing signal.

Light guide member 142 may be made of glass or transparent synthetic resin. Light emitting element 141 may emit light in the visible range of radiation, infrared radiation or other detectable radiation wavelength. Motor 8 and its component parts, such as, bearing 80A, its stator (not shown), rotational shaft 80B, rotor 82 and hub 83, together with it drive circuit are supported on motor base 81. Thus, rotor 82 is located on chassis 2 so that the space directly beneath detection hole 2C can be made small thereby enabling the employment of a motor 8 having a reduced height.

Operation of Information Recording/Reproducing Device 1

When magnetic recording medium 2A is inserted into medium slot 31A via front bezel 31, as illustrated in FIG. 7, magnetic recording medium 2A forces aside medium engaging member 533 of trigger member 53, rotating trigger plate 53 in the direction of arrow D which also extends spring 54. As a result, cam 532 on trigger member 53 is released from cutout 524 in slide member 52. Member 52, in turn, is released and moved by spring 50 in a forward direction of arrow A, and is guided by guide pin 40 1 along the length of elongated aperture 521 as well as by guide plate 402 along aperture 522. The rate of movement of slide member 52 is controlled by the action of rotary damper 542, which has been previously explained. Due to the forward movement of slide member 52, cam 12C of the collet bar 12 rides up and over smaller diameter roller 529, rotating collet bar 12 in the downward direction indicated of arrow E, which also causes compression of spring 120 of collet retaining member 122. As shown in FIG. 2, collet bar 12 rotation also causes leaf spring 122C of collet retaining member 122 to lower medium holder 101 by rotation in the direction of arrow G. Accordingly, medium holder 101 is rotated downward, supporting arm 101D is positioned at a level wherein lower magnetic head 71 can engage the lower recording surface of medium 2A. Also, medium 2A is level with the top of motor hub 83 and is ready for final axial alignment with and engagement to hub 83 by means of the downward insertion of collet 13 in the hub opening as illustrated in FIG. 6.

In connection with medium driving mechanism 6, rotation of collet bar 12 about shaft 405 lowers collet 13 of clamping mechanism 6A. As shown in FIG. 6, elastomeric finger segments 136 of collet 13 are flexed and inserted through center hole 2B of magnetic recording medium 2A and also positioned partly within the inner confines of hub 83. As a result, collet 13 automatically centers and clamps recording medium 2A between collet 13 and hub 83. Since bifurcated end portion 12A of collet bar 12 is loosely held on the outer diameter of collet shaft 131, end portion 12A will move slightly downwardly along shaft 131, as indicated by arrow Y in FIG. 6, releasing collet 13 from being held in a tight grip between collet bar end portion 12A and collet retaining member 122. Thus, collet 13 is released from the direct spring pressure of collet retaining member 122 so that it freely rotates with magnetic recording medium 2A and driven hub 83. Moreover, since the diameter of aperture 122A of collet retaining member 122 is larger than the diameter of collet projection 133, the outer peripheral surface of collet projection 133 does not continually contact with the inner peripheral surface of aperture 122A. Therefore, collet 13 freely rotates in its position as shown in FIG. 6 with only upper surface 139 of rim member 132 engaged by lower surface 122D of collet retaining member 122, which is of minimal contact area.

Relative to carriage mechanism 7, as shown in FIG. 7, medium engaging member 533 will be pushed by inserted medium 2A from being directly beneath end 12D of collet bar 12, permitting subsequent downward movement of collet bar 12 in the direction of arrow E, causing collet bar 12 to descend. As a result, arm 7B with second magnetic head 72 will also lower due to the action of spring 73 with the descent of collet bar extension 12D because the lowering of arm 7B at connecting bar 71B is permitted by the lowering of collet bar extension 12D. Head 72 will then come in contact with the medium surface of magnetic recording medium 2A.

It should be noted that since first magnetic head 71 is in a position beneath medium 2A, head 71 contacts the under-medium surface when medium 2A is lowered by medium lifting and lowering mechanism 10. Thus, information can be recorded onto rotated magnetic recording medium 2A employing first and second magnetic heads 71 and 72, and information recorded on magnetic recording medium 2A can thereafter be read or reproduced.

The rotational position of magnetic recording medium 2A can be detected by medium position detection mechanism 14. As shown in FIG. 10, the light emitted from light emitting element 141 is reflected and passed through light guide member 142 onto magnetic recording medium 2A. During periods of rotation of medium 2A when detection hole 2C is not present in the light path between guide end 142B and detector element 146, light is intercepted or blocked, whereas, when detection hole 2C is aligned in the light path between guide end 142B and detector element 146, a portion of the light from guide end 142B reaches detector element 146. Based on this detection, detector element 146 provides an output signal to a control circuit on circuit board 147 indicative of the rotational timing of medium 2A.

Explanation will now be made of the removal of magnetic recording medium 2A from device 1 with reference to FIG. 7. When medium removal button 51 is pushed inwardly, slide member 52 is moved in the direction shown by arrow B. As a result, cam 12C of collet bar 12 descends from roller 529, and collet bar 12 rotates in the direction of arrow F due the compression force exerted from spring 120. In carriage mechanism 7, extension 12D of collet bar 12 is also raised in elevation which causes second carriage arm 7B, via its connecting bar 71B in contact with collet bar extension 12D, to also move upwardly against the force of spring 73, placing second magnetic head 72 in its standby position. Also, in clamping mechanism 6, upward rotation of collet bar 12 elevates collet 13 of clamping mechanism 6A. Thus, as illustrated in FIG. 5, bifurcated end portion 12A of collet bar 12 also moves upwardly on and along collet shaft 131 in the direction indicated by arrow X and securely grips collet rim member 132 between collet bar end portion 12A and collet retaining member 122. Furthermore, in connection with medium transfer mechanism 10, leaf spring 122C of collet retaining member 122 also elevates, permitting medium holder 101 to elevate in the direction of arrow H due to the force of spring 102, which also elevates recording medium 2A away from lower magnetic head 71 and hub 83. Under these conditions, magnetic recording medium 2A is in a position for forward movement out of device 1 and exit through medium slot 31A in front bezel 31. At this point, if medium removal button 51 is pushed further inwardly into device 1, cutout 524 of slide member 52 moves to a position where it is adjacent to cam 532 of trigger member 53. When cam 532 and cutout 524 overlap one another, trigger member 53 is forced by its spring 54 to rotate in the direction of arrow C, which moves medium engaging member 533 in the direction of arrow A, which movement causes member 533 to engage the edge of medium 2A and pushes magnetic recording medium 2A forward out of bezel slot 31A. Accompanying this delivery operation of medium 2A, medium engaging member 533 is returned to a position directly beneath collet bar extension 12D so that collet bar 12 is no longer able to descend from its standby position because member 533 functions as a stop preventing any movement of collet bar 12 in the direction of arrow E. At the same time, trigger member cam 532 also becomes again engaged in cutout 524 of slide member 52 preventing any substantial movement of slide member 52 sufficient to cause any operation to collet bar 12.

As previous indicated in connection with clamping mechanism 6A, collet bar bifurcated end 12A and collet retaining member 122 firmly grip rim member 132 of collet 13. Then, when magnetic recording medium 2A is clamped, as shown in FIG. 6, collet retaining member 122 continues to maintain a constant force on collet 13, and its bottom surface 122D serves as a sliding surface with collet surface 139 so that lateral limited movement, i.e., substantially normal to the rotation axis of collet 13, is permitted for purposes of collet centering in hub 83, while providing minimal frictional contact of collet retaining member 122 with the rotating surface 139 of collet 13. Thus, even if the relative position and the size and tolerances of collet 13, collet bar 12 and collet retaining member 122 are not accurate and, also, are not of comparatively large dimensional height, or are provided as shown in FIGS. 5 and 6 without the employment of a bearing assembly (ball or roller, for example) or the like, a medium clamping operation can securely be performed with proper centering and without need of a costly bearing assembly due to minimal frictional contact between collet retaining member 122 and collet rim member 132. Furthermore, since collet 13 is an integral molded part, e.g., resin or plastic, comprising shaft 131, rim member 132 and finger segments 136, there is no need for additional collet parts which add to both manufacture costs and assembly costs. This type of structure helps render the assembly device 1 to be easier, less complicated, and the reduced height of collet 13, compared to those collets in the art, as previous explained, permits miniaturization of the device mechanisms as well as a reduction in the height of device 1 for providing a more compact structure. Taking into consideration the reduction on profile height accomplished with the design of motor 8 and the collet assembly comprising collet 13 and collet bar 12, about a 39% reduction in overall profile height of recording/reproducing device 1 can be achieved. In this connection the conventional device may have a height of about 41.5 mm. However, the utilization of the techniques and structural approaches described relative to this invention, the height of device 1 is about 25.4, which is a significant height reduction defining what is meant herein, at least in part, as to meaning of "compact", being better suited for smaller user type devices, such as, laptop computers, hand-held computers, hand-held players, and hand-held CD-ROM record and playback devices.

When magnetic recording medium 2A is not inserted, medium engaging member 533 of the trigger member 53 is positioned below collet bar extension 12D, which extension also functions to provide the lifting and permit the lowering of second carriage arm 7B of carriage mechanism 7. In this way, medium engaging member 533 also functions as a locking mechanism in preventing the accidental downward movement or lowering of arm 7B when no medium 2A has been inserted into device 1. This prevents any damage from occurring from head 72 coming into direct contact with lower head 71. Thus, if an impact force is applied to recording device 1, in the absence of a magnetic recording medium 2A inserted into device 1, magnetic head 72 will not prematurely fall via spring 73 colliding with magnetic head 71 or any other components of mechanism 7. Therefore, first and second magnetic heads 71 and 72 can be protected from such accidental damage without the requirement or need to provide additional component parts in device 1 to provide for such a locking mechanism. Moreover, the locking mechanism formed by member 533 is successfully unlocked, with surety, when magnetic recording medium 2A is inserted into device 1, and is securely place in locked position when magnetic recording medium 2A is discharged from device 1 via button 51. Moreover, in the absence of medium 2A in device 1, arm 7B will not be deflected even with change in orientation of device 1 and a change in the center of gravity of the end portion of arm 7B, since connecting bar 71B at the end portion of arm 7B remains in biased contact with collet bar extension 12D thereby providing a unit having improved portability capabilities with high impact resistance and reliability.

Collet bar 12 is operated at a low speed due to the functional operation of rotary damper 542, which also renders magnetic recording medium 2A to be delivered at a slow or reduced rate upon its exit from device 1. Since head 72 is lowered to the surface of medium 2A at a low rate, the impact force occurring when head 72 concurrently touches the undersurface of medium 2A will be small. Also in connection with medium transfer mechanism 10, since medium 2A is lowered at a low rate due to the same effect, the impact force occurring when head 71 touches medium 2A will also be small. Thus, heads 71 and 72 and medium 2A are all protected from damage due to undesired impact because of the damping effects of rotary damper 542. Similarly, since collet 13 clamps magnetic recording medium 2A at a low rate, magnetic recording medium 2A can be securely clamped and is not damaged in the process.

It will be realized by those skilled in the art that other damping devices can be used in place of rotary damper 542. In addition, since clamping mechanism 6A, loading/unloading mechanism 5, medium transfer mechanism 10, trigger member 53 with its member 533 and collet bar 12, together constituting an interlocking, safety mechanism, assembled on single base support 4, these components can be easily repaired and replaced so that a high level of maintenance is achievable with this design, and high assembly accuracy can be achieved and maintained, thereby improving overall quality of the finished product with built-in years of service-free operation.

Relative to position detection mechanism 14, the placement of rotor 82 on the same side of chassis 2 as motor hub 83 reduces the spacing between the lower surface of medium 2A and the top surface of rotor 82 or its cover frame 9. In other words, while the motor height profile has been reduced, rotor 82 is now in the way of the desired alignment arrangement relative to detection hole 2C of medium 2A. Therefore, there is a lack of adequate space for a direct light emitter/detector arrangement of the type shown at 3128, 3129 in FIG. 17. The arrangement of FIG. 18, as indicated before, is not adequate for consideration. However, with the arrangement shown in FIG. 10, the lateral displacement of light source due to the presence of rotor can be accomplished by the employment of thin structure of light guide member 142. As a result, there is no requirement to position light emitting element 141 or its associated wiring components directly beneath medium 2A due to the utilization of thin light guide member 142. Thus, the spacing between magnetic recording medium 2A and rotor 82 need only be made wide enough to accommodate light guide member 142 so that device 1 can be constructed of even thinner cross sectional thickness to provide for a compact disc device. Particularly, for the purpose of rendering device 1 of thinner contour, when the entire structure of motor 8, i.e., rotor 82, its stator and hub 83, are directly coupled and placed all on the same side of motor base 81, as described previously, there is no space remaining to provide for the placement of a emitting element and associated light detector (FIGS. 17 and 18) since the position of rotor 82 is directly beneath magnetic recording medium 2A, as seen from FIG. 10. However, light guide member 142 is accommodated by the narrow space beneath magnetic recording medium 2A but above rotor 82. The light emitted from light emitting element 141, while passing through light guide member 142, is internally reflected at reflection portions 144 and 145 within the light guide. When the light exists from end 142B, the light is substantially collimated, so that the amount of light varies little even if the axial alignment of detector element 146 is not precisely aligned with the axial alignment of light exiting from guide end 142B. Thus, the detection of light for producing a timing signal can be carried out under conditions of high reliability, even in the case where detector element 146 is slightly bumped, bent or slightly moved from its original alignment position, since there is little influence to the derived timing signal relative to the amount of light emitted from light emitting element 141. In other words, with the use of light guide member 93, the effects of changes in the amount of light from emitter 146 has little, if any effect, on the timing signal derived via detector element 146.

Lastly, when the entire structure of motor 8 is formed on chassis 2, as disclosed herein, motor 8 can be secured to chassis 2 by means of the securance of only motor base 81 to the chassis frame, as shown in FIG. 10 rendering cost effective the assemblage of motor 8 to chassis 2.

While the invention has been described in conjunction with several specific embodiments, it is evident to those skilled in the art that many further alternatives, modifications and variations will be apparent in light of the foregoing description. For example, although the foregoing explanation of this invention relates specifically to application in a magnetic recording/reproducing device, the invention herein can also be applied to a light recording/reproducing device, such as, a CD-ROM drive, an optical reproducing device or the like. Thus, the invention described herein is intended to embrace at such alternatives, modifications, applications and variations as fall within the spirit and scope of the appended claims.

What is claimed is:

1. An information recording/reproducing device comprising:

a medium driving mechanism for rotatably driving a recording medium in said device, a clamping mechanism for clamping said recording medium to a medium support section of said medium driving mechanism, said clamping mechanism comprising (a) a collet for placement into a central hole in said recording medium and having a shaft with a first end integral with said collet, (b) a collet rim member integral with a second end of said shaft (c) a collet support member having an end for engaging and supporting said collet at said shaft at said second shaft end relative to a first side surface of said collet rim member and operative to move said collet to and from a standby position to a clamping position, said support member engaging end on said shaft being of loose tolerance to permit said support member engaging end to move along at least a portion of length of said shaft, and (d) a collet retaining member being coupled to a second side surface of said collet rim member opposite to said first side surface., said collet retaining member biasing said collet rim member against said support member engaging end when said collet support member is in said standby position whereby said collet rim member is secured between said collet retaining member and said collet support member.

2. The information recording/reproducing device according to claim 1 wherein said collet retaining member is secured in substantially parallel relation to said collet support member.

3. The information recording/reproducing device according to claim 1 said collet retaining member maintains a bias on said collet via said collet shaft when said collet is placed in said clamping position with disengagement of said support member engaging end from said first side surface.

4. The information recording/reproducing device according to claim 1 wherein said collet support member comprises a bifurcated end portion for loosely encompassing a portion of said collet shaft.

5. The information recording/reproducing device according to claim 1 wherein said collet rim member second surface includes a projection, an aperture formed in said collet retaining member to receive said projection, the width of said projection being smaller than the width of said aperture so that said collet is able to shift laterally within prescribed limits relative to said collet support member and said collet retaining member.

6. The information recording/reproducing device according to claim 1 comprising a spacer with high lubricity properties positioned between said collet rim member second side surface and the undersurface of said collet retaining member whereby said collet retaining member is coupled to said second side surface of said collet rim member.

7. The information recording/reproducing device according to claim 1 wherein said collet retaining member includes a leaf spring having a first end connected to said collet support member and a second end in contacting relation with said second side surface of said collet rim member.

8. An information recording/reproducing device having a recording medium clamping mechanism including a collet assembly that provides for a reduced profile height, said collet assembly comprising:

I a collet member having:

(a) a collet having a central portion connected to an outer annular periphery portion with resilient segments for flexible placement through a central opening in said recording medium, (b) a shaft having a first end integral with said collet central portion, (c) an annular rim member having a central portion integral with a second end of said shaft, (d) an annular recess formed between said collet shaft and said outer annular periphery portion accessible from between said annular rim member and an inner annular edge of said outer annular periphery portion, II an elongated collet support arm having:
- (a) an end portion for engaging said collet at said shaft in said annular recess and supporting said collet member at said second shaft end relative to a first side surface of said annular rim member,
- (b) said end portion having a jog portion so that its tip fits into said recess and extends over and around an upper surface of said outer annular periphery portion so that the planar extent of said elongated collect support arm is aligned fairly centrally with the lateral width of said collect member,
- (c) said support arm engaging end on said shaft being of loose tolerance to permit said support arm engaging end portion to move along at least a portion of length of said shaft, and
- (d) a collect retaining member connected to said collect support arm, said collect retaining member being coupled to a second side surface of said annular rim member opposite to said surface and biasing said annular rim member against said support arm engaging end portion whereby said annular rim member is secured between said collect retaining member and said collect support arm.

9. The information recording/reproducing device according to claim 7 wherein said collet annular rim member second surface includes a projection, and an aperture formed in said collet retaining member to receive said projection, the width of said projection being smaller than the width of said aperture so that said collet member is able to shift laterally within prescribed limits relative to said collet support arm.

10. The information recording/reproducing device according to claim 9 comprising a spacer with high lubricity properties positioned between said collet annular rim member second side surface and the undersurface of said collet retaining member whereby said collet retaining member is coupled to said second side surface of said collet annular rim member.

11. The information recording/reproducing device according to claim 10, wherein said collet retaining member further includes a leaf spring having a first end connected to said collet support arm and a second end, having said aperture formed therein, in contacting relation with said second side surface of said collet rim member.

* * * * *